March 6, 1934. C. C. BRADBURY 1,950,134
CENTRALIZED LUBRICATING APPARATUS
Filed July 15, 1929  2 Sheets-Sheet 1
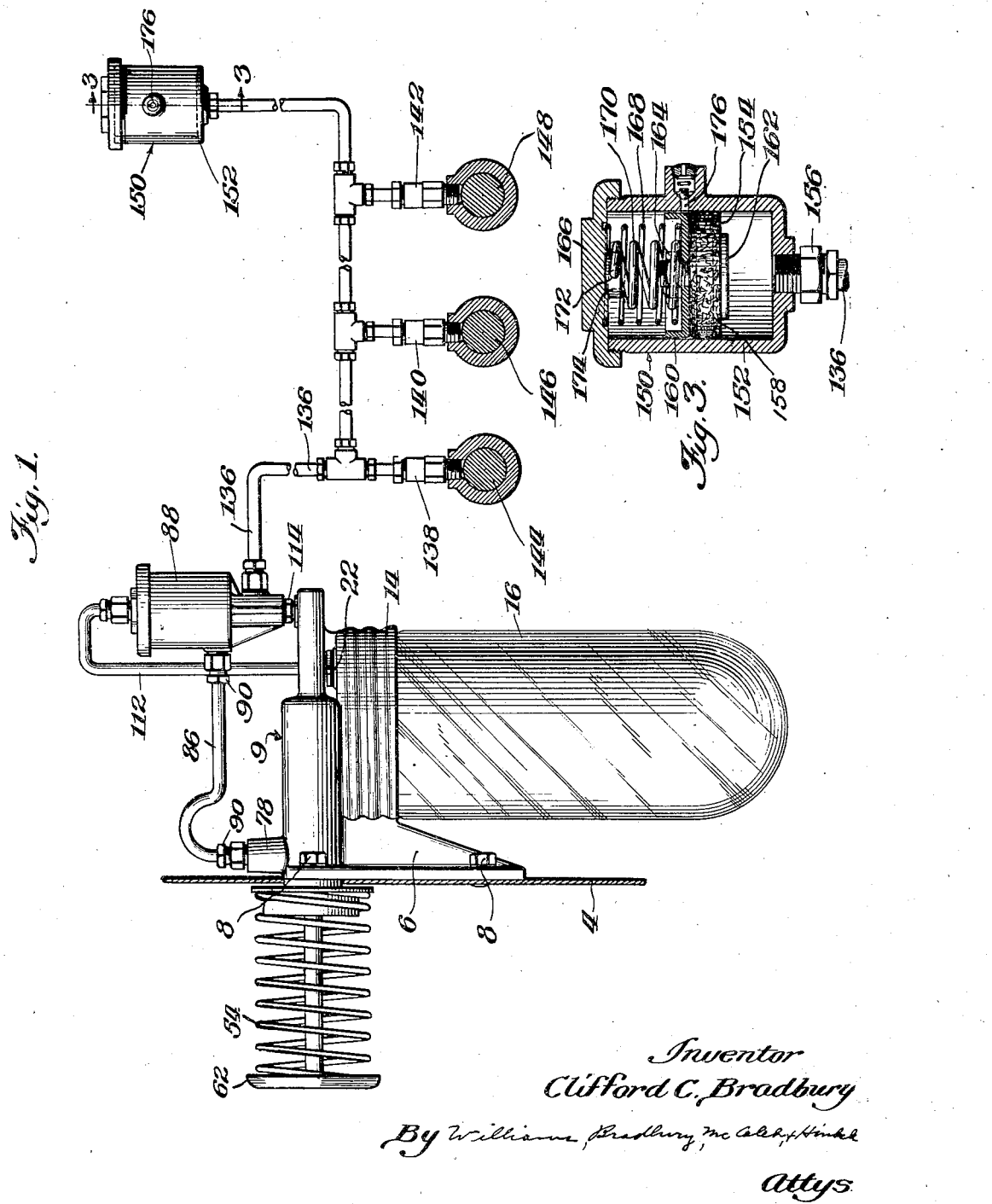
Inventor
Clifford C. Bradbury
By Williams, Bradbury, McCaleb & Hinkle
Attys.

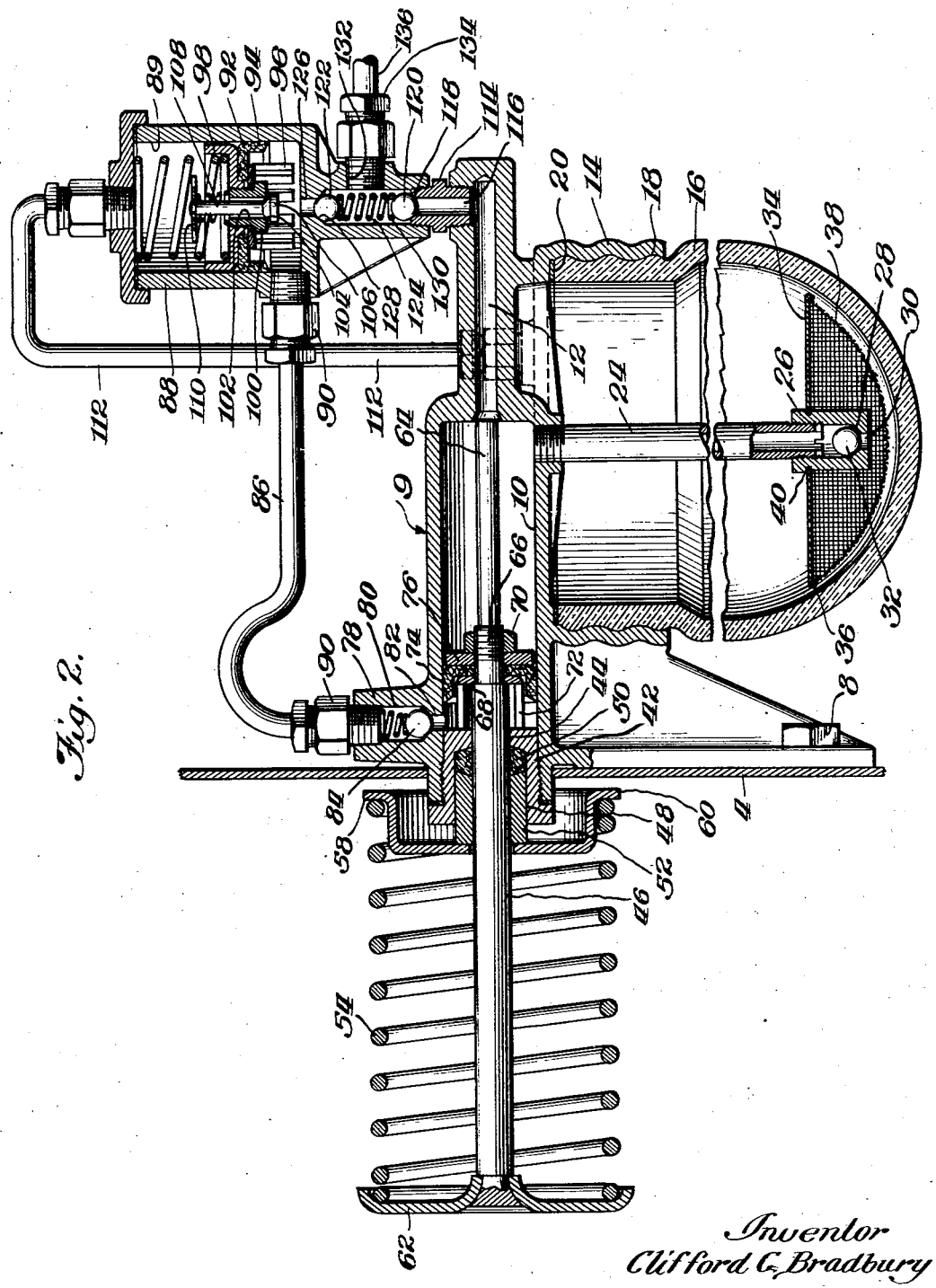

Patented Mar. 6, 1934

1,950,134

UNITED STATES PATENT OFFICE 1,950,134

CENTRALIZED LUBRICATING APPARATUS

Clifford C. Bradbury, Glencoe, Ill., assignor to Alemite Corporation, Chicago, Ill., a corporation of Delaware Application July 15, 1929, Serial No. 378,258

16 Claims. (Cl. 184—7)

My invention relates, generally, to centralized lubricating apparatus and more particularly to an improved form of combined pump and reservoir installation for centralized lubricating systems. The invention is particularly useful in connection with centralized chassis lubricating systems for automotive vehicles.

It is an object of my invention to provide a centralized lubricating apparatus having a main reservoir and pump and auxiliary reservoirs and pumps spaced apart therefrom so that a charge of lubricant may be fed to the bearings under high pressure and a continuous supply provided from the various reservoirs under a lower pressure.

It is a further object of my invention to provide a lubricating system having a main reservoir and a series of auxiliary reservoirs connected thereto for providing a constant supply of lubricant to the bearings adjacent the various reservoirs.

It is a further object to provide a pump and reservoir installation of the above mentioned type, which is simple in construction, may be economically manufactured, and which is easily operable.

Other objects and advantages will appear from the following description, reference being had to the accompanying drawings, in which Figure 1 is a side elevation of the pump and reservoir mounted on the dashboard of an automobile, the conduit arrangement being shown more or less diagrammatically in elevation, and an auxiliary reservoir;

Figure 2 is a central vertical section through the pump and reservoir; and

Figure 3 is a vertical section of a remotely placed reservoir taken on the line 3—3 of Fig. 1.

I have illustrated my invention as mounted upon a dashboard 4 of an automotive vehicle, although it will be obvious that the pump and reservoir installation may be mounted in any other suitable manner upon or adjacent the machine to be lubricated. The pump and reservoir installation has a bracket 6 integral therewith, which may be secured to the dashboard 4 in any suitable manner, as by bolts 8.

The pump and reservoir installation comprises a main casting 9 which has a cylinder portion 10 that passes through a rounded opening in the dash 4. The casting 9 is provided at its rearward end with a reduced bore 12 and at its lower end with a receptacle cover 14. An elongated, bowl-shaped glass lubricant reservoir 16 has molded threads 18 formed in its upper end which are adapted to cooperate with rolled threads formed in the receptacle cover 14 of the casting 9. An annular gasket 20 makes possible a lubricant-tight joint between the upper edge of the reservoir 16 and its cover 14. The cover 14 has a suitable filling aperture which is normally closed by a cap 22 which may be of any desired shape.

An inlet pipe 24 has its upper end threaded into the lower portion of the cylinder wall 10 near its front end, and at its lower end carries a foot valve body 26. The body 26 has a valve seat 28 and an inlet aperture 30 at its lower end, a gravity actuated ball check valve 32, normally resting on said seat and closing the inlet aperture. A plate 34 is secured to the body 26 and has an inwardly and downwardly projecting annular flange 36 which serves as a retainer for a strainer 38 which is in the shape of a segment of the surface of a sphere. The plate 34 is preferably secured to the body 26 by passing over the upper end of the body until the plate rests upon an annular shoulder 40 on the body and the upper reduced diameter end portion of the body then riveted over to the shape, as shown in Figure 2. This construction provides a rigid and oil-tight mounting for said plate.

The forward end of the cylinder 10 is threaded to receive a head 42 which has an axial bore 44 forming a guide for a piston rod 46. The head 42 is provided with a counterbore 48 to receive a packing 50 which is held in position by a gland 52 slidable in the bore 48. This gland projects beyond the end of the head 42 and is normally pressed inwardly by a spring 54 which bears upon a flange 58 of a hat-shaped stamping 60. This stamping has a central aperture through which the rod 46 passes. The end of the rod 46 is riveted to the pedal 62. The inner end of the rod 46 has a plunger portion 64 and a threaded portion 66, both of reduced diameter, and over which a piston assembly may be passed.

The piston assembly is fixedly secured against the shoulder 68 by a nut 70 screwed on the threaded portion 66 and may comprise, generally, a slotted cup-shaped stop and cup leather former 72, a cup leather washer 74 and a backing plate 76.

The forward end of the cylinder 10 is provided with a boss 78. The boss is provided with apertures 80 and 82 connecting with the interior of the cylinder 10. A ball check valve 84 is mounted in the aperture 80, closing the aperture 82. A conduit 86 connects an auxiliary reservoir 88 with the forward end of the cylinder 10 by means of bushings 90.

The auxiliary reservoir 88 is provided with a cylinder 89 and also with a spring pressed piston 92. The piston is composed of a cup leather 94, a cup leather former and stop member 96 and a backing plate 98. The backing plate contains a centrally located tapped hole and all the parts are fastened together to form a unit by a stud 100. Stud 100 has a central aperture 102 formed at its lower edge to provide a valve seat 104 for a spring pressed valve 106. The valve has an extended valve stem 108 and at its upper end a spring retaining plate 110 which has a plurality of radial slots. A return conduit 112 extends from the top of reservoir 88 to the main reservoir 16.

The auxiliary reservoir 88 is mounted upon the body 9 at its extreme end by means of a union 114. Union 114 has an internal bore 116 which communicates with the end of high pressure cylinder 12, and at its upper end is provided with a valve seat 118. Spring pressed ball check valves 120 and 122 are mounted in a compartment 124 in the lower end of auxiliary reservoir 88. Communication is provided between the lower end of cylinder 89 and compartment 124 by means of passage 126 which has a valve seat 128 formed at its lower edge for cooperation with valve 122. Due to the opposite actions desired from the valves 120 and 122, a single compression spring 130 provides the spring pressure normally to keep both valves seated.

The wall of compartment 124 is threaded at 132 to receive a bushing 134 attached to one end of conduit 136. This conduit is the main line of a conduit system which leads to all of the bearings to be lubricated and is here diagrammatically illustrated as connected through suitable T's or unions to suitable resistance unit fittings 138, 140 and 142 associated with bearings 144, 146 and 148, respectively.

The bearings mentioned are representative of a large number of chassis bearings forming part of the automotive vehicles upon which the pump and reservoir installation is mounted. In lieu of the resistance units mentioned, measuring valves or other means properly to proportion the discharge of the pump among the various bearings to be lubricated, may be used.

The conduit 136 continues to a remotely placed reservoir 150. This reservoir may be placed at any convenient place upon the chassis and comprises generally a cylindrical body 152 and a spring pressed plunger 154. It will be readily understood that several of these reservoirs may be placed in conduit 136 at convenient places on the chassis or other parts of the automotive vehicle.

Conduct 136 enters reservoir 150 at or near its lower end and is connected thereto by means of a suitable bushing 156. Plunger 154 may be made in any suitable manner and for the purpose of illustration I have shown it as consisting of a cup leather 158 and a sheet metal follower 160 assembled upon and fastened together by the combined bolt and limit stop 162 and nut 164.

Reservoir 150 is provided with a cover 166 having an annular recess to guide a compression spring 168 interposed between the cover 166 and the plunger 154. A stronger compression spring 170 is also interposed and is fastened against lateral movement by having its upper end passed through an aperture 172 in upper limit stop 174 formed in cover 166. To guard against breakage in the line under a highly abnormal pressure a safety valve 176 is positioned in cylinder wall 152 at a point where the stronger spring 170 has been considerably depressed before the valve opening will have been cleared by the cup leather plunger 154. The spring 170 is shown in approximately its normal unstressed position, and it therefore becomes effective only as the pressure in the reservoir approaches the maximum which the system is built to withstand.

In operation the reservoir 16 is filled with a suitable lubricant through the filling opening provided. Assuming that the conduit system and pump are fully primed with lubricant, operation of the pump by applying pressure to the pedal 62, will compress the spring 54, moving the piston rod and both pistons 74 and 64 forwardly. The piston 64 of a comparatively small diameter, will force lubricant in cylinder 12 through the bore 116, past check valve 120, into compartment 124 and out through the conduit 136 to the bearings to be lubricated and to the auxiliary reservoir 150. It will be noted that this charge of lubricant is expelled under extremely high pressure and for the purpose of flushing out resistance units or bearings which may become clogged with dirt or gummed with lubricant.

Due to the displacement as piston rod 46 enters cylinder 10, lubricant will be forced from the cylinder under high pressure past the cup leather piston 74, through passage 82, displacing valve 84, and through the conduit 86 into the lower end of the auxiliary reservoir 88.

Repeated operation of the foot pedal will force lubricant from the auxiliary reservoir 88 through passage 126, past check valve 122, into chamber 124 and out to the bearings through conduit 136. Further operation will force lubricant beyond the bearings and into the remote reservoir 152 until same is filled. After that auxiliary reservoir 88 will be filled with lubricant until the spring retaining plate of check valve 110 strikes the upper wall of auxiliary reservoir 88, causing check valve 108 to open. Further operation of the foot pedal will now cause lubricant to flow back to the main reservoir through the return conduit 112 and lubricant forced out through conduit 136 will flow into reservoir 152 and out of safety valve 176.

Upon removing the foot from the pedal 62, the spring 54 will force the pistons and piston rod rearwardly and the lubricant behind the cup leather piston 74 will be forced outwardly to the auxiliary reservoir under a comparatively low pressure. While the piston is moving rearwardly the cylinders are primed by flow of lubricant past the check valve 32 and through the pipe 24, the strainer 38 preventing the entrance of any foreign matter into the pump. Since the pistons will move rearward rather slowly under the influence of the spring 54 (depending upon the viscosity of the lubricant and other conditions), the priming of the cylinders 10 and 12 with the charge of lubricant for the next operation will take place slowly so that the strainer 38 may be of very fine mesh and still not interfere with the operation of the pump.

The glass reservoir 16 forms a very economical and convenient container for the supply of lubricant, making it possible at all times readily to ascertain the quantity of lubricant contained therein. The presence of foreign matter in the reservoir may be observed and the reservoir removed from the cover and support 9 and cleaned when an undue deposit of dirt is noted. When the reservoir is being filled with lubricant the plate 34 prevents the lubricant from falling directly upon the strainer 38 and thus eliminates the possibility of small air bubbles being carried through the strainer.

It will be noted that the spring 54 serves not only the purpose of returning the pistons of the pump after operation thereof, but also maintains the packing 50 in tight sealing engagement with the rod 46 and eliminates the possibility of leakage or the necessity of taking up the wear in the packing.

This invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. A combination pump and reservoir installation for automotive chassis lubricating systems comprising a body containing a low pressure cylinder, a flange on said body, a high pressure cylinder in the forward end of said body, a lubricant receptacle secured to the flange on said body and depending therefrom, a foot-operated piston reciprocably mounted in said low pressure cylinder, said piston including check valve means preventing flow of lubricant in a forward direction, a rod secured to said piston for reciprocable movement in said high pressure cylinder, and an outlet conduit connected to each end of said body and communicating with said cylinders respectively.

2. A combination pump and reservoir installation for automotive chassis lubricating systems comprising a body containing a cylinder, a flange on said body, a high pressure cylinder in the forward end of said body, a lubricant receptacle secured to the flange on said body and depending therefrom, a foot-operated piston reciprocably mounted in said cylinder, a rod secured to said piston for reciprocable movement in said high pressure cylinder, and an outlet conduit connected to each end of said body, one of said outlets communicating with a series of bearings to be lubricated and the other extending to an auxiliary reservoir in communication with said bearings to be lubricated.

3. A combination pump and reservoir installation for automotive chassis lubricating systems comprising a body containing a cylinder, a high pressure cylinder in the forward end of said body, a lubricant receptacle secured to said body and depending therefrom, a foot-operated piston reciprocably mounted in said cylinder, a rod secured to said piston for reciprocable movement in said high pressure cylinder, and outlet conduits connected to opposite ends of said body, one of said outlets communicating with a series of bearings to be lubricated and the other extending to an auxiliary reservoir in communication with said bearings to be lubricated, said auxiliary reservoir being provided with a spring-pressed plunger for feeding lubricant to the bearings under pressure.

4. A combination pump and reservoir installation for automotive chassis lubricating systems comprising a body containing a cylinder, a high pressure cylinder in the forward end of said body, a lubricant receptacle secured to said body and depending therefrom, a foot-operated piston reciprocably mounted in said cylinder, a rod secured to said piston for reciprocable movement in said high pressure cylinder, and an outlet conduit connected to each end of said body, one of said outlets communicating with a series of bearings to be lubricated and the other extending to an auxiliary reservoir in communication with said bearings to be lubricated, said auxiliary reservoir being provided with a spring-pressed plunger for feedng lubricant to the bearings under pressure, and said auxiliary reservoir being provided with a safety valve.

5. A combination pump and reservoir installation for automotive chassis lubricating systems comprising a body containing a cylinder, a high pressure cylinder in the forward end of said body, a lubricant receptacle secured to said body and depending therefrom, a foot-operated piston reciprocably mounted in said cylinder, a rod secured to said piston for reciprocable movement in said high pressure cylinder, and an outlet conduit connected to each end of said body, one of said outlets communicating with a series of bearings to be lubricated and the other extending to an auxiliary reservoir in communication with said bearings to be lubricated, said auxiliary reservoir being provided with a spring-pressed plunger for feeding lubricant to the bearings under pressure, said auxiliary reservoir being provided with a safety valve and a return conduit to said reservoir.

6. A lubricating system containing a main reservoir, a low pressure cylinder, a high pressure cylinder, a pressure pump in connection with both cylinders, a conduit connecting said reservoir to a series of bearings to be lubricated, a second conduit connecting said reservoir to a second reservoir, said second reservoir in communication with said first conduit, and valve means intermediate said second reservoir and said first reservoir in said second conduit, said first named conduit communicating with said first reservoir through said high pressure cylinder and said second named conduit communicating with said first reservoir through said low pressure cylinder.

7. A pump unit for centralized chassis lubricating systems, comprising a body casting formed with a supporting bracket, a low pressure pump cylinder in said body, a high pressure cylinder in line therewith, a source of lubricant connected to said cylinders, a check valve to prevent flow of lubricant from said cylinders to said source, a cup leather piston reciprocable in said first cylinder, a second piston in line with said first piston and reciprocable in said second cylinder, a piston rod secured to both and projecting from the other end of said first cylinder and having a pedal at its extremity, a packing around said rod, a gland for compressing said packing, and a single spring to force said gland against said packing and to move both of said pistons and rod throughout the return stroke thereof.

8. In a centralized lubricating system, having a plurality of bearings to be lubricated, a branched conduit system for conveying lubricant to said bearings, resistance means associated with each of said bearings for restricting the flow of lubricant thereto, a source of lubricant and auxiliary reservoirs in said conduit system, a double pump for forcing lubricant from said source into said system comprising a cup leather piston and cylinder and a secondary piston and cylinder in line with said first named piston and cylinder, said pump being arranged to force lubricant into said system under high pressure upon application of manual force to the secondary piston thereof during its forward stroke, and simultaneously charging said auxiliary reservoirs both on the forward and return strokes and drawing a new charge of lubricant into the pump cylinders on the return stroke, and a spring for actuating said pistons upon their return stroke.

9. In a centralized lubricating system, the combination of a lubricant reservoir, a pressure pump associated therewith having high and low pressure plungers each plunger receiving lubricant directly from said reservoir, a plurality of bearings to be lubricated, a conduit system from said reservoir to said bearings, and an auxiliary reservoir remotely placed in said conduit system to feed lubricant under pressure to said bearings.

10. In a centralized lubricating system, the combination of a lubricant reservoir, a pressure pump having two cylinders, a plurality of bearings to be lubricated, a conduit system to said bearings, a pair of separate conduits each of said conduits connecting one of said cylinders with said conduit system, and auxiliary reservoirs remotely placed in said system to feed lubricant under pressure to said bearings, said auxiliary reservoirs supplied with lubricant by said pressure pump.

11. In a centralized lubricating system, the combination of a lubricant reservoir, a pressure pump, a low pressure plunger on said pump, a plurality of bearings to be lubricated, a conduit system from said reservoir to said bearings, and auxiliary reservoirs in said conduit system placed to feed lubricant under pressure to said bearings, one of said auxiliary reservoirs being supplied with lubricant solely by the low pressure plunger of said pressure pump.

12. In a centralized lubricating system, the combination of a main lubricant reservoir, a plurality of bearings to be lubricated, a conduit system from said reservoir to said bearings, an auxiliary reservoir remotely placed relative to said main reservoir to feed lubricant under pressure to said bearings, said auxiliary reservoir being supplied with lubricant from said main reservoir and said auxiliary reservoir including a cylinder and a spring pressed plunger, and ball-check safety valve adapted to be opened by an abnormal pressure in the conduit system.

13. In a centralized lubricating system, the combination of a lubricant reservoir, a pressure pump associated therewith, a plurality of bearings to be lubricated, a conduit system from said reservoir to said bearings, and auxiliary reservoirs placed to feed lubricant under pressure to said bearings, one of said auxiliary reservoirs being provided with a ball-check safety valve for relieving abnormal pressure in the conduit system.

14. In a centralized lubricating system a cylinder body, a high pressure cylinder in the forward end of said body, a piston reciprocable in said cylinder body, a piston for said high pressure cylinder secured to said first piston, an auxiliary reservoir, an outlet conduit connected to each of said cylinders, one of said outlets connecting with a series of bearings to be lubricated and the other extending to said auxiliary reservoir, said auxiliary reservoir being in connection with said bearings.

15. In a centralized lubricating system for an automotive chassis, a cylinder body and a high pressure cylinder in the forward end of said body, a piston reciprocable in said cylinder body, a rod secured to said piston for reciprocable movement in the said high pressure cylinder, outlet conduits, one connected to each end of said body, and communicating with said cylinder body and high pressure cylinder respectively, a plurality of auxiliary reservoirs, one of said outlets connecting with a series of bearings to be lubricated and with one of said auxiliary reservoirs, and the other of said outlets connecting with the other of said auxiliary reservoirs, said second reservoir being in connection with said bearings and with said first reservoir.

16. A pump unit for centralized lubricating systems comprising a cylinder, a second cylinder in line with and in front of said first cylinder, a piston rod for said cylinders having a cup leather piston secured thereto and slidable in said first cylinder, the cup leather of said piston being faced in a direction to permit rearward flow past it when the piston is being moved forwardly and to draw in a new charge of lubricant when the piston is being moved rearwardly, said piston rod extending through said cup leather piston and forming a plunger for said second cylinder.

CLIFFORD C. BRADBURY.